Jan. 7, 1936. R. R. CANDOR 2,027,223
REFRIGERATING APPARATUS
Filed March 28, 1929 3 Sheets-Sheet 1

Inventor
Robert R. Candor,
By Spencer, Hardman & Fehr
Attorneys

Jan. 7, 1936.  R. R. CANDOR  2,027,223
REFRIGERATING APPARATUS
Filed March 28, 1929  3 Sheets-Sheet 3
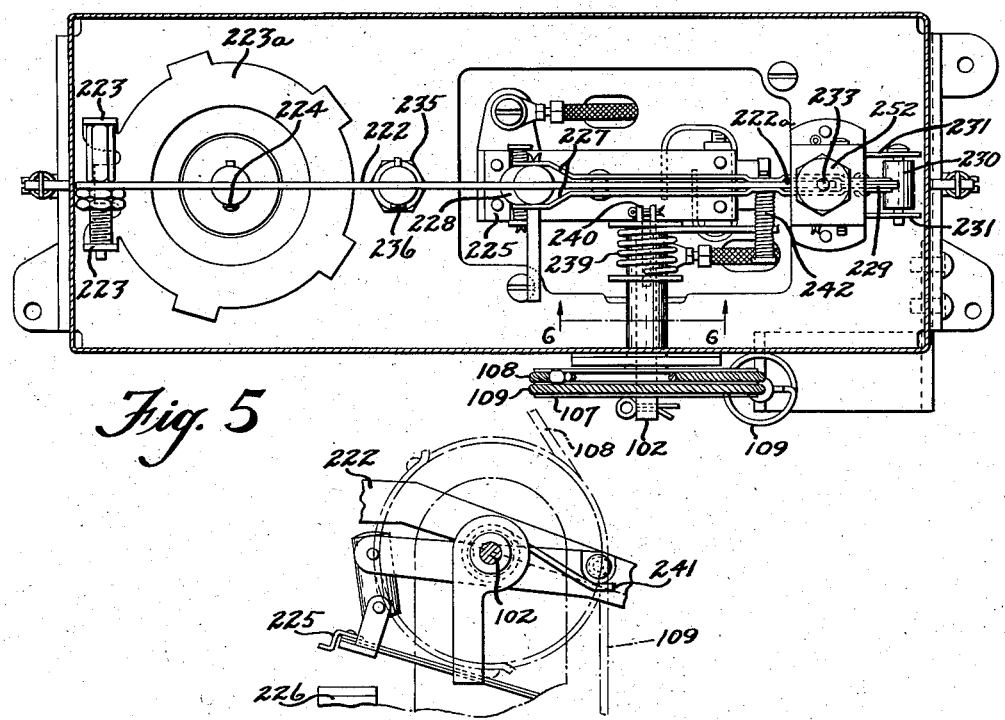
Fig. 5
Fig. 6
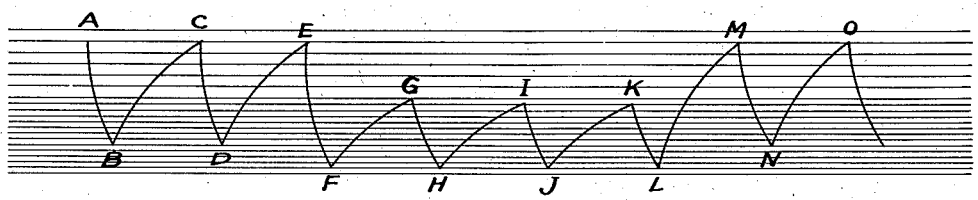
Fig. 7
INVENTOR.
Robert R Candor
BY
Spencer Hardman and Fehr
ATTORNEYS Patented Jan. 7, 1936

2,027,223

UNITED STATES PATENT OFFICE 2,027,223

REFRIGERATING APPARATUS

Robert R. Candor, Dayton, Ohio, assignor, by mesne assignments, to General Motors Corporation, a corporation of Delaware Application March 28, 1929, Serial No. 350,682

36 Claims. (Cl. 62—4)

This invention relates to refrigerating apparatus and more particularly to that type of apparatus which provides refrigeration in a plurality of cabinets located, for instance, in apartment houses or the like.

An object of this invention is to provide a refrigerating apparatus capable of supplying refrigeration to a plurality of cabinets and which is capable of providing an abnormally low temperature for a portion of a time cycle in a series of time cycles, to enhance the freezing of liquids, or for other requirements during such portion of the cycle.

Another object of this invention is to provide an apparatus capable of indicating the relative amount of refrigeration consumed by any cabinet in a plurality of cabinets.

Further objects and advantages of the present invention will be apparent from the following description, reference being had to the accompanying drawings, wherein a preferred form of embodiment of the present invention is clearly shown.

In the drawings:
Fig. 1 is a view, somewhat diagrammatic in form, showing an apparatus embodying features of this invention.

Fig. 5 is a sectional view of the bellows operated snap switch taken along the line 5—5 of Fig. 4;

Figure 1:
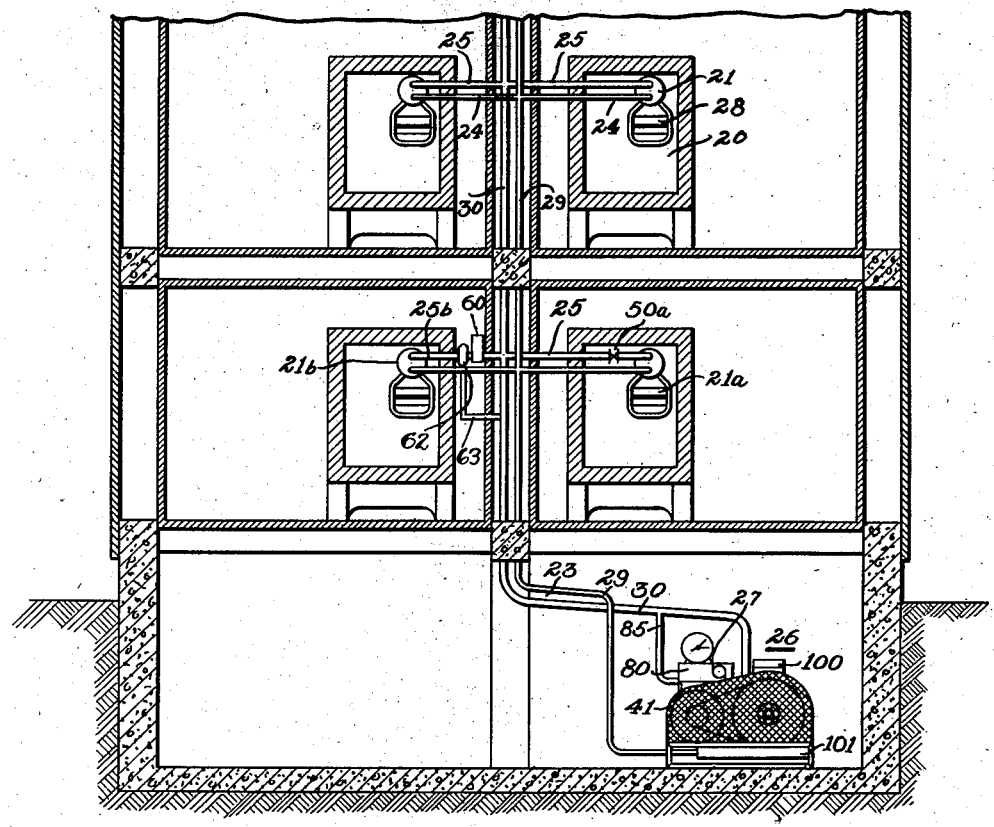

Fig. 6 is a sectional view of a portion of the temperature regulating mechanism and the switch contact taken along the line 6—6 of Fig. 5; and Fig. 7 is a temperature time chart of the evaporating means showing graphically the normal and low temperature cycles.

A refrigerating apparatus embodying features of this invention may comprise a plurality of cabinets to be cooled, each generally designated as 20. These cabinets may be provided with a plurality of cooling units, or evaporators, generally designated as 21. A cooling medium circulating line, generally designated as 23, may be provided with one or more connections such as 24 and 25, leading from the evaporators to the circulating line. A device or means 26 may be provided to cause the circulation of the cooling medium in the line 23, and means 27 may be provided for varying the effectiveness of the cooling medium in the cooling units for a pre-determined portion of each cycle of a series of time cycles.

The cabinets 20 may be of any suitable construction and may be suitably insulated in the well-known manner.

The cooling units 21 may be of any suitable construction and may, if desired, be of the type disclosed in the patent to R. G. Osborn, 1,556,708 issued October 13, 1925, or such as is disclosed and shown in the copending application of Jesse G. King and Sylvester Schweller S/N 670,357 filed October 23, 1923, now Patent No. 1,805,700. These cooling units may be provided, if desired, with sleeves 28 for the reception of ice freezing trays of the usual and well-known character.

The cooling medium circulating line 23, if the cooling medium is to be a volatile liquid, may under certain circumstances include a liquid refrigerant distributing line 29 and an evaporated refrigerant collecting line 30. The line 29 is provided with connections 24 to the cooling units 21 and the line 30 has connections 25 with the cooling units 21. The cooling units are provided with refrigerant inlet controls, such as float controlled valves 31 of the character disclosed in the patent to Osborn for maintaining the cooling units and evaporators 21 in a substantially flooded condition.

The means or device 26 to cause a circulation of cooling medium may include a compressor 100, a condenser and a liquid refrigerant receiver 101 of the character more fully described in the application of Ernest Dickey for Refrigerating apparatus Serial No. 349,796, filed March 25, 1929, now Patent No. 2,021,052 dated November 12, 1935, to which reference is made, if necessary, for further details. The compressor 100 may be driven by an electric motor 41, and the motor is adapted to be controlled by a controller 80, which is adapted to maintain the refrigerant in said evaporators within a predetermined temperature range. A convenient way of accomplishing this is to provide an expansible bellows 218, connected by the line 85 to the line 30. The expansible bellows 218 is adapted to operate a snap switch, which is adapted to control the starting and stopping of the motor 41. A controller suitable for this purpose is disclosed in the copending application of Otto M. Summers S/N 281,599 filed May 30, 1928 now Patent No. 1,819,979 dated August 18, 1931 or in the patent to Lloyd Blackmore No. 1,658,323, issued February 7, 1928. A controller of the Summers type is shown in modified form in connection with Figs. 4, 5 and 6. Referring now more particularly to Figs. 4, 5 and 6, an operating member or lever 222 pivoted on ears 223 of an elevated platform 223a is adapted to follow the movements of the bellows 218 by being pivoted therein as at 224.

The operation of the lever 222 causes the switch contacts 225 and 226 to be brought into contact with each other or separated. This operation is effective by means of a double beam lever 227 which straddles lever 222 and is pivoted thereto by the pin 242. The lever 227 is connected to the switch contact 225 by means of a link 228. The other end of the lever 227 is provided with a cam 229 for the purpose of providing a snap action.

The snap action of the contact 225 with respect to the contact 226 is produced by a cam system which includes the hardened steel nose or cam 229 against which a hardened steel roller 230 is biased by a carrier 231 and a spring 232.

As the pressure builds up within the flexible metallic bellows 218, the latter expands and since the lever 222 is pivoted to this bellows as at 224 and fulcrumed to the supporting frame of the device as at 223, it is evident that the bellows will raise the operating lever 222. The upward movement of the lever is, however, resisted by a yieldable adjusting system comprising a coil spring carried within an adjustable casing 252 and bearing against a plunger 233 which acts against the extremity 222a of the lever 222. When the pressure decreases and the bellows 218 collapse, the downward movement of the lever will be resisted by the coil spring 234, whose tension may be regulated by nuts 235 carried on a threaded arm pivoted to the lever 222 as at 236. Balancing spring 237 adjusted by nuts 238 may be used on the opposite side of the base of the device for resisting the tension of the spring 234. The spring 234 of the resilient adjusting system comprising plunger 233 and the adjustable cap 252 are preferably so adjusted as to produce what may be termed normal predetermined adjustment.

The extremity 222a of the lever 222 bears against the plunger 233 only on the upward action of the lever 222. As the lever 222 begins to descend, the extremity 222 does not touch the plunger 233. Thus, the plunger 233 affects the starting pressure, but not the stopping pressure. The cap 252 is, therefore, a starting adjustment. This type of controller is adapted to maintain the refrigerant pressure in the line 30 within predetermined pressure limits. Also, as disclosed in the last named application and patent, the device 80 may be temporarily changed or adjusted so as to maintain the line 30 at a different predetermined range of pressure or temperature merely by turning or pulling a handle. In the said patent of Otto M. Summers No. 1,819,979, the device is adapted to be so adjusted by turning a shaft corresponding to shaft 102 to a position different from the normal setting.

It is evident that by interposing a resistance to the downward descent to the lever 222, the operation of the switch contacts will be delayed, so that the system will continue operating for a longer period of time, thus prolonging the freezing cycle of the system. Likewise, if the resistance to the downward descent of the lever 222 is increased, it will require a greater effort on the part of the diaphragm or bellows 218 to pull the lever down into contact breaking position (the descent of the lever 222 causing the raising of contact 225 away from contact 226, thus breaking the circuit.)

Figure 2:
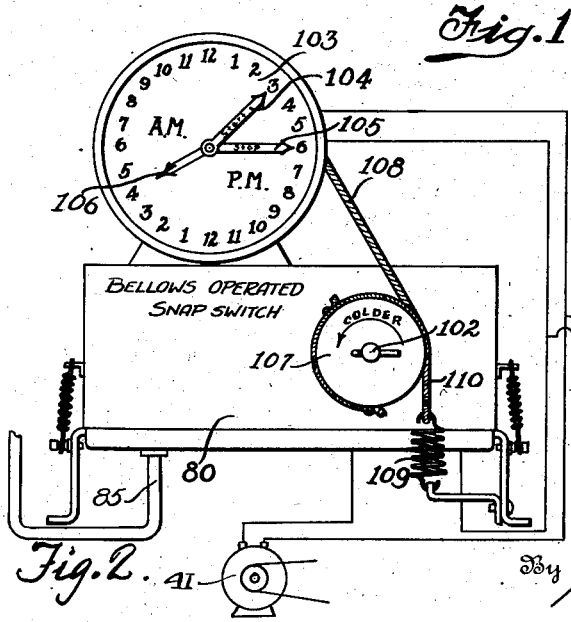
Fig. 2 is an elevation of a portion of the apparatus shown in Fig. 1.
Figure 4:
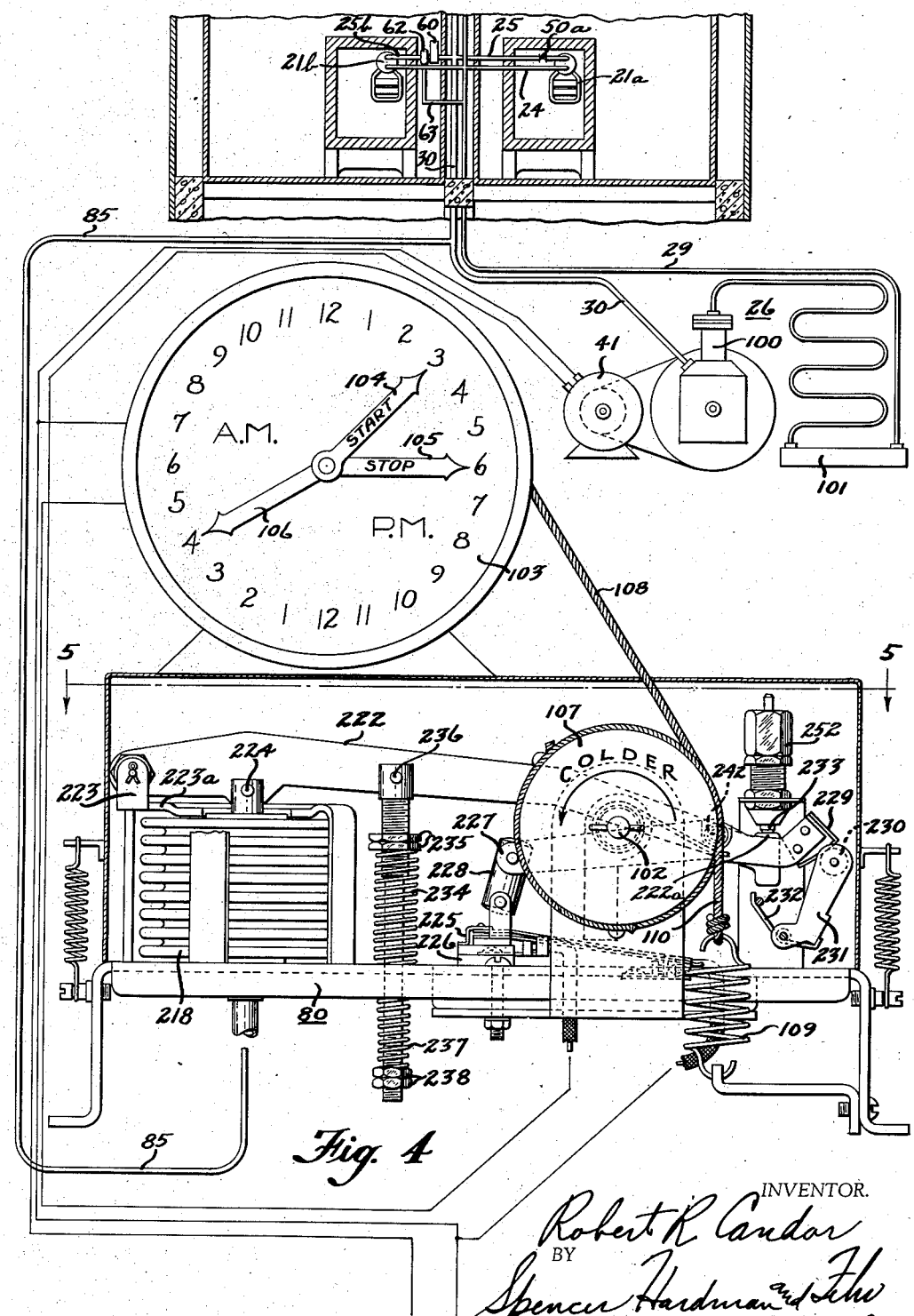
Fig. 4 is a vertical sectional view through the bellows operated snap switch, together with the clock mechanism and a diagrammatic representation of the refrigerating system.

A suitable method of interposing such a resistance is illustrated in Figs. 4, 5 and 6 and consists in placing a resilient obstruction in the path of the downwardly moving lever 222. Preferably a spring is used for this purpose and in the preferred embodiment of the invention the spring (as shown in dotted lines in Fig. 4 and in greater detail in Figs. 5 and 6) comprises a coil spring 239 hooked into and carried by a slotted end 240 of the shaft 102 so arranged that one end 241 of the spring projects, while the body of the spring is forced to rotate with the shaft 102 when the same is turned by the flexible rope 108 and the pulley 107. The pin 242, which may be grooved as shown in Fig. 5, is engaged by the spring 239 in such a manner that when the lever 222 descends, the pin 242 engaging the spring leg 241 will have its downward descent resisted to an extent corresponding to the degree to which the spring 239 is wound. The spring 239 carried by the shaft 102 may be rotated and wound up so that a tension or force is caused to bear against the pin 242 and, therefore, against the downward descent of the lever 222. The result of this retardation of the downward descent of the lever 222 will be to cause a prolongation of the freezing cycle, in other words a longer than normal operation of the compressor. In accordance with this invention the shaft 102 may be turned by a time clock 103 of any well-known construction, which is preferably adapted to be kept in operation by an electric current, such as the current which supplies the motor of the refrigerating apparatus. A suitable time clock for this purpose is disclosed in the patent to Stenhouse et al 654,186, July 24, 1900, it being understood that such a clock may be electrically wound or actuated if desired. This type of clock is adapted to be set by any suitable means, such as by the combined hands and handles 104 and 105 so as to cause the clock to turn the shaft 102 during a predetermined portion of a time cycle, such as during a few hours in the afternoon of every day. If desired, the clock may also include a time indicating hand or handle 106. A way of causing the clock 103 to turn the shaft 102 is shown in Fig. 2. The shaft 102 is provided with a pulley 107 to which is attached the flexible rope 108 leading to the actuating mechanism of the clock 103. If desired a spring 109 may be provided and connected to the pulley 107 by means of the rope 110. The spring 109 is adapted to create a countertorque in the pulley 107 so that when the mechanism in the clock 103 releases the tension on the rope 108, the spring 109 returns the pulley 107 to its normal setting. When the hand 106 of the clock reaches a position of the hand 104, the clock pulls the rope 108 against the tension of the spring 109 and turns the shaft 102 so as to adjust the controller 80 to maintain a different predetermined temperature or pressure range in the refrigerating system or in the evaporators. This turning of the shaft brings the spring leg 241 of the coil spring 239 into engagement with the pin 242 so that the downward descent of the lever 222 will be retarded to cause a prolongation of the freezing cycle and lower the pressure and temperature range of the refrigerating system. Clocks of the type indicated are well-known and their mechanism need not be here specifically further disclosed.

The normal cyclic operation of the system is indicated by the curve A B C D E F in Fig. 7 in which the point B represents the point at which the switch opens to stop the compressor and the slope B C the warming up period, and C the point at which the switch cuts in to start the compressor. The slope C D represents the cooling period during the operation of the compressor. D represents another point at which the switch opens to stop the compressor. The slope D E represents another warming up period and E another point at which the switch cuts in to start the compressor.

If now the hand 106 of the clock reaches a position of the hand 104, the clock will pull the rope 108 against the tension of the spring 109 and turn the shaft 102 so as to interpose more resistance to the descent of the lever 222, and the compressor will cut out at the point F and again at the points H, J and L and cut in at the points G, I and K to provide three cycles in the colder position. It is evident that the starting points G, I and K are considerably lower than the starting points C and E and that the stopping points F, H, J and L are considerably lower than the stopping points B and D so that a colder average temperature of the evaporating means is maintained to provide faster freezing at this time. If now the hand 106 reaches the hand 105 the mechanism in the clock 103 will release the tension on the rope 108 and the spring 109 will return the pulley 107 and the shaft 102 to its normal setting and thereby the controller will be returned to its normal setting and will start the compressor at the points M and O and stop the compressor at the point N which respectively correspond to the normal starting points C and E and the normal stopping points B and D.

It sometimes may occur that one or more of the evaporators 21 should not have its temperature range varied by the clock 103. Thus a valve 50a, corresponding to the valve 50a disclosed in the application of Ernest Dickey, heretofore referred to, may be provided in the connection 25. The type of valve 50a is an automatic pressure regulator adapted to maintain the pressure within the evaporator 21a at its original setting, so that the variation in the pressure of the line 30 does not disturb the temperature within the evaporator 21a. The valve 50a thus enables the user of the evaporator 21a to maintain the evaporator 21a at any temperature equal to, or higher than, the normal operating temperature for which the system is set, and the abnormal operation, caused by the time clock which reduces the temperature in the other evaporators need not disturb the temperature of the evaporator 21a.

It sometimes happens, particularly in apartment houses, that certain users consume a large proportion of the refrigeration furnished. It is desirable to provide means for metering the refrigeration thus consumed. Thus the cabinet 21b, or any plurality of cabinets, or all of the cabinets, may be provided with metering devices. A gas meter 60 may be placed in the connection 25b and, if desired, in all of the other connections 25. This gas meter is adapted to indicate the amount of evaporated refrigerant which passes through the connection 25b. Merely by reading the indications at 61 it is possible to determine how much is to be paid by the user of the cabinet 21b. Thus if all of the cabinets are provided with meters, it is possible to apportion equitably the cost of operation of the refrigerating system in accordance with the meter readings.

Figure 3:
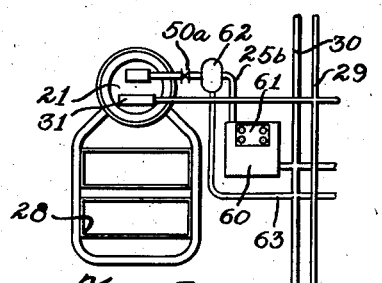
Fig. 3 is a view, somewhat diagrammatic, of another portion of the apparatus shown in Fig. 1.

The meter 60 preferably is constructed so that it does not trap any of the lubricant returning from the evaporator to the compressor. However if it is desired to make a meter which is liable to trap the lubricant, a lubricant separator 62 may be placed in the line 25b between the evaporator and the meter 60. This separator may be of any suitable construction, and may be a separator such as shown in the patent to Wheeler, No. 441,995, issued December 2, 1890 with the addition that the lubricant receiving portion of the separator may be provided with a float controlled valve with the float in the collected lubricant and the valve in the lubricant outlet adapted to allow the lubricant to pass into the lubricant outlet or branch 63 and from thence to the line 30. Thus the separator 62 is adapted to by-pass the meter 60. When a refrigerating system is not provided with the clock control herein disclosed it may be desirable to interpose a valve 50a and meter 60 in each evaporator 21, as shown in Fig. 3, and thus operate the system in the manner disclosed in the patent of Ernest Dickey heretofore referred to and thus have a record of the relative amount of refrigeration which each user of the cabinets consumes. By the terms "chronometrically determined" and "chronometrically controlled" periods of time as used in the appended claims, I mean any periods determined by a measurer of time, such as an ordinary spring driven or electric clock. Likewise, by the term "chronometric controlling means" as used in the appended claims I mean any means controlled by a measurer of time, such as an ordinary spring driven or electric clock.

While the form of embodiment of the invention as herein disclosed constitutes a preferred form, it is to be understood that other forms might be adopted, all coming within the scope of the claims which follow.

What is claimed is as follows:

1. A refrigerating apparatus comprising a plurality of cabinets to be cooled, a plurality of evaporators in said cabinets, a refrigerant circulating line connected to said evaporators, a refrigerant circulating device connected to said line, said device being provided with an automatic adjustable controller for maintaining the refrigerant in said evaporators within a predetermined temperature range, and means automatically adjusting said controller to vary the temperature range for a predetermined portion of each cycle of a series of time cycles.

2. A refrigerating apparatus comprising a plurality of cabinets to be cooled, a plurality of evaporators in said cabinets, a liquid refrigerant distributing line, an evaporated refrigerant line, said lines having connections to each of said evaporators, a valve in each evaporator for controlling the admission of liquid refrigerant into said evaporator, a device connected to said lines for receiving evaporated refrigerant, liquefying said refrigerant and delivering said liquefied refrigerant to said distributing line, an adjustable controller for said device controlling the operation of said device to maintain the pressure within said collecting line within predetermined limits, and means automatically adjusting said controller to vary at least one of said limits for a predetermined portion of each cycle of a series of time cycles.

3. A refrigeranting apparatus comprising a plurality of cabinets to be cooled, a plurality of evaporators in said cabinets, a liquid refrigerant distributing line, an evaporated refrigerant line, said lines having connections to each of said evaporators, a valve in each evaporator for controlling the admission of liquid refrigerant into said evaporator to maintain said evaporator in a flooded condition, a device connected to said lines for receiving evaporated refrigerant, liquefying said refrigerant and delivering said liquefied refrigerant to said distributing line, an adjustable controller for said device controlling the operation of said device to maintain the pressure within said collecting line within predetermined limits, and means automatically adjusting said controller to vary at least one of said limits for a predetermined portion of each cycle of a series of time cycles.

4. A refrigerating apparatus comprising a plurality of cabinets to be cooled, a plurality of evaporators in said cabinets, a refrigerant circulating line connected to said evaporators, a refrigerant circulating device connected to said line, said device being provided with an automatic adjustable controller for maintaining the refrigerant in said evaporators within a plurality of temperature cycles of predetermined temperature range within a single time cycle, means automatically adjusting said controller to vary the temperature range for a predetermined portion of each time cycle of a series of time cycles and means connected to at least one of said evaporators for preventing the temperature range in said evaporator or evaporators to be varied by said last named means.

5. A refrigerating apparatus comprising a plurality of cabinets to be cooled, a plurality of evaporators in said cabinets, a liquid refrigerant distributing line, an evaporated refrigerant line, said lines having connections to each of said evaporators, a valve in each evaporator for controlling the admission of liquid refrigerant into said evaporator, a device connected to said lines for receiving evaporated refrigerant, liquefying said refrigerant and delivering said liquefied refrigerant to said distributing line, an adjustable controller for said device controlling the operation of said device to maintain the pressure within said collecting line within predetermined limits, means automatically adjusting said controller to vary at least one of said limits for a predetermined portion of each cycle of a series of time cycles and means connected to at least one of said evaporators for preventing the temperature range in said evaporator or evaporators to be varied by said last named means.

6. A refrigerating system comprising, in combination, a cooling unit, means for circulating refrigerating medium through said unit, control means for controlling said first mentioned means to maintain said unit between predetermined limits of temperature, means for temporarily modifying the action of said control means and for automatically restoring the system to the normal control by said control means after a chronometrically determined time interval of operation by said modified action of said circulating means.

7. Refrigerating apparatus including a cooling unit and means for supplying refrigeration to said cooling unit, a controller for normally maintaining the temperature of the cooling unit between predetermined temperature limits, chronometrically controlled means for periodically varying at least one of the temperature limits of the cooling unit and then returning the cooling unit to its normal temperature limits, and adjusting means for varying the time at which the varying of the temperature limits begins.

8. Refrigerating apparatus including a cooling unit and means for supplying refrigeration to said cooling unit, a controller for normally maintaining the temperature of the cooling unit between predetermined temperature limits, chronometrically controlled means for periodically varying at least one of the temperature limits of the cooling unit and then returning the cooling unit to its normal temperature limits, and adjusting means for varying the time at which the varying from normal of the temperature limits ends.

9. Refrigerating apparatus including a cooling unit and means for supplying refrigeration to said cooling unit, a controller for normally maintaining the temperature of the cooling unit between predetermined temperature limits, means for periodically varying at least one of the temperature limits of the cooling unit and then returning the cooling unit to its normal temperature limits, and means for indicating the time at which the varying of the temperature limits is set to occur.

10. Refrigerating apparatus including a cooling unit and means for supplying refrigeration to said cooling unit, a controller for normally maintaining the temperature of the cooling unit between predetermined temperature limits, means for periodically varying at least one of the temperature limits of the cooling unit and then returning the cooling unit to its normal temperature limits, and means for indicating the time setting at which the temperature limits of the cooling unit are returned to normal.

11. Refrigerating apparatus including a cooling unit and means for supplying refrigeration to said cooling unit, a controller for normally maintaining the temperature of the cooling unit between predetermined temperature limits, means for periodically varying at least one of the temperature limits of the cooling unit and then returning the cooling unit to its normal temperature limits, and means for indicating the period in which the temperature limits of the cooling unit are varied from normal.

12. Refrigerating apparatus including a cooling unit and means for supplying refrigeration to said cooling unit, a controller for normally maintaining the temperature of the cooling unit between predetermined temperature limits, means for periodically varying at least one of the temperature limits of the cooling unit and then returning the cooling unit to its normal temperature limits, and means for varying the time at which the varying of the temperature limits of the cooling unit occurs.

13. Refrigerating apparatus including a cooling unit and means for supplying refrigeration to said cooling unit, a controller for normally maintaining the temperature of the cooling unit between predetermined temperature limits, means for periodically varying at least one of the temperature limits of the cooling unit and then returning the cooling unit to its normal temperature limits, and means for varying the duration of the period in which the temperature limits are varied from normal.

14. Refrigerating apparatus including a cooling unit and means for supplying refrigeration to said cooling unit, a controller for normally maintaining the temperature of the cooling unit between predetermined temperature limits, and chronometrically controlled means for varying at least one of the temperature limits from normal and then returning the cooling unit to its normal temperature limits.

15. Refrigerating apparatus including a cooling unit and means for supplying refrigeration to said cooling unit, a controller for normally maintaining the temperature of the cooling unit between predetermined temperature limits, means for periodically varying at least one of the temperature limits of the cooling unit and then returning the cooling unit to its normal temperature limits, said last mentioned means including chronometrically controlled means for initiating the varying of the temperature limits of the cooling unit from normal.

16. Refrigerating apparatus including a cooling unit and means for supplying refrigeration to said cooling unit, a controller for normally maintaining the temperature of the cooling unit between predetermined temperature limits, means for periodically varying at least one of the temperature limits of the cooling unit and then returning the cooling unit to its normal temperature limits, said last mentioned means including chronometrically controlled means for terminating the variations of the temperature limits of the cooling unit.

17. Refrigerating apparatus including a cooling unit and means for supplying refrigeration to said cooling unit, a controller for normally maintaining the temperature of the cooling unit between predetermined temperature limits, means for periodically varying at least one of the temperature limits of the cooling unit and then returning the cooling unit to its normal temperature limits, said last mentioned means including chronometrically controlled means for returning the cooling unit to normal temperature limits.

18. Refrigerating apparatus including a cooling unit and means for supplying refrigeration to said cooling unit, a controller for normally maintaining the temperature of the cooling unit between predetermined limits, chronometric means including means for indicating the time of the day and means for periodically varying at least one of the temperature limits of the cooling unit, said chronometric means including means cooperating with the indicating means for setting the periodic means.

19. A refrigerating system comprising in combination, an evaporator, means for withdrawing gaseous refrigerant from the evaporator to condense the same and to circulate the condensed refrigerant to the evaporator, and apparatus for controlling said means including mechanism for obtaining normally a certain average temperature of the evaporator, said apparatus including a setting device for obtaining a different average temperature of the evaporator, said apparatus also including chronometrically operated means cooperating with said setting device and controlling the duration of effectiveness thereof, said chronometrically operated means being operable independently of said first named means and said controlling apparatus for automatically restoring said mechanism to normal operating condition.

20. A refrigerating system comprising in combination, an evaporator, means for withdrawing gaseous refrigerant from the evaporator to condense the same and to circulate the condensed refrigerant to the evaporator, and apparatus including mechanism for starting and stopping said means automatically to obtain normally a certain average temperature of said evaporator, said apparatus including a setting device for obtaining substantially continuous operation of said means to produce a different average temperature of the evaporator, said apparatus also including chronometrically operated means cooperating with said setting device and controlling the duration of effectiveness thereof, said chronometrically operated means being operable independently of said first named means and said apparatus for automatically restoring said mechanism to normal operating condition.

21. A refrigerating system comprising in combination, an evaporator, means for withdrawing gaseous refrigerant from the evaporator to condense the same and to circulate the condensed refrigerant to the evaporator, and apparatus including mechanism for starting and stopping said means automatically to obtain normally a certain average temperature of said evaporator, said apparatus including a setting device for obtaining substantially continuous operation of said means to produce a lower average temperature of the evaporator, said apparatus also including chronometrically operated means cooperating with said setting device and controlling the duration of effectiveness thereof, said chronometrically operated means being operable independently of said first named means and said apparatus for automatically restoring said mechanism to normal operating condition.

22. A refrigerating system comprising in combination, an evaporator, means for withdrawing gaseous refrigerant from the evaporator to condense the same and to circulate the condensed refrigerant to the evaporator, and apparatus including mechanism for cyclically starting and stopping said means automatically in response to certain high and low temperatures respectively of the evaporator, a device for temporarily modifying the operation of said mechanism to secure the starting of the cycles at a lower degree of temperature than normally required, said apparatus including chronometrically operated means cooperating with said device and controlling the duration of effectiveness thereof, said chronometrically operated means being operable independently of said first named means and said apparatus for automatically restoring said mechanism to normal operating condition.

23. A refrigerating system comprising in combination, an evaporator, means for withdrawing gaseous refrigerant from the evaporator to condense the same and to circulate the condensed refrigerant to the evaporator, and apparatus including mechanism for cyclically starting and stopping said means automatically in response to certain high and low temperatures respectively of the evaporator, a device for temporarily modifying the operation of said mechanism to secure the starting of the cycles at a lower degree of temperature than normally required, said apparatus including chronometrically operated means co-operating with said device and controlling the duration of effectiveness thereof, said chronometrically operated means being operable independently of said first named means and said apparatus for automatically restoring said mechanism to normal operating condition, and said chronometrically operated means including means adapted to be adjusted for varying the time of modified cycles.

24. A refrigerating system comprising in combination, a cooling unit, means for circulating a refrigerating medium through said unit, control means for controlling said first named means to maintain said unit between predetermined limits of temperature, means for temporarily modifying the action of said first named means, chronometrically operated means associated with said last named means for controlling the duration of effectiveness of said modifying means, said chronometrically operated means being operable independently of said first named means and said control means for automatically restoring the system to normal control by said control means, and said chronometrically operated means including means for varying the time of effectiveness of said modifying means.

25. A refrigerating system comprising in combination, a cooling unit, means for circulating a refrigerating medium through said unit, control apparatus normally controlling the flow of said medium whereby to cool said unit to a predetermined average temperature, a device for temporarily modifying the flow of said medium to obtain a different average temperature in said unit, chronometrically operated means associated with said modifying device for controlling the duration of effectiveness thereof, said chronometrically operated means being operable independently of said first named means and said control apparatus for automatically restoring the system to normal control by said control apparatus, and said chronometrically operated means including means for varying the time of effectiveness of said modifying device.

26. A refrigerating system comprising in combination, a cooling unit, means for cyclically circulating a refrigerant medium through said unit, control apparatus for controlling the circulating cycles of said means whereby to cool said unit to a predetermined average temperature, a device for temporarily modifying the cycles of operation of said means whereby to obtain a different average temperature in said unit, chronometrically operated means associated with the said modifying device for controlling the duration of effectiveness thereof, said chronometrically operated means being operable independently of said first named means and said control apparatus for automatically restoring the system to normal operating condition.

27. A refrigerating system comprising in combination, a cooling unit, means for circulating a refrigerant medium through said unit, control means for controlling said first named means to maintain said unit between predetermined limits of temperature, means for temporarily modifying the action of said control means, chronometrically operated means associated with said last named means for controlling the duration of effectiveness thereof, said chronometrically operated means being operable independently of said first named means and said control means for automatically restoring the system to the normal control by said control means, and said chronometrically operated means including means for varying the time of effectiveness of said modifying means.

28. Refrigerating apparatus including a cooling unit and means for supplying refrigeration to said cooling unit, a control means for normally maintaining the temperature of the cooling unit between predetermined limits, and chronometrically controlled means for modifying the operation of the apparatus to maintain the temperature of the cooling unit between other temperature limits.

29. Refrigerating apparatus including a cooling unit and means for supplying refrigeration to said cooling unit, a control means for normally maintaining the temperature of the cooling unit between predetermined limits, means for modifying the operation of the apparatus to maintain the temperature of the cooling unit between other temperature limits, and chronometrically controlled means for returning the apparatus to normal operation.

30. Refrigerating apparatus including a cooling unit and means for supplying refrigeration to said cooling unit, a control means for normally maintaining the temperature of the cooling unit between predetermined limits, and chronometrically controlled means for modifying the operation of the apparatus to maintain the temperature of the cooling unit between other temperature limits, and means for terminating the modified operation of the apparatus.

31. Refrigerating apparatus including a cooling unit and means for supplying refrigeration to said cooling unit, a control means for normally maintaining the temperature of the cooling unit between predetermined limits, means for modifying the operation of the apparatus to maintain the temperature of the cooling unit between other temperature limits, and chronometrically controlled means for controlling the duration of the modified operation.

32. Refrigerating apparatus comprising a refrigerant liquefying unit and an evaporating unit in refrigerant flow relationship, a source of electricity, means for energizing said liquefying unit from said source of electricity, a control device responsive to conditions created by said evaporator for starting and stopping said means, chronometrically controlled means actuated by said source of electricity for modifying the action of said control device.

33. Refrigerating apparatus comprising a refrigerant liquefying unit and an evaporating unit in refrigerant flow relationship, a source of electricity, means for energizing said liquefying unit from said source of electricity, a control device responsive to conditions created by said evaporator for starting and stopping said means, chronometrically controlled means actuated by said source of electricity for measuring time cycles and for modifying said control device at least once during each time cycle.

34. Refrigerating apparatus comprising a refrigerant liquefying unit and an evaporating unit in refrigerant flow relationship, a source of electricity, means for energizing said liquefying unit from said source of electricity, a control device responsive to conditions created by said evaporator for starting and stopping said means, chronometrically operated means actuated by said source of electricity first for modifying the action of and afterward restoring to its normal condition said control device.

35. Refrigerating apparatus including a cooling unit and means for supplying refrigeration to said cooling unit, pressure responsive means for normally maintaining the temperature of the cooling unit between predetermined temperature limits, and means for periodically applying a force to the pressure responsive means for periodically varying one of the temperature limits of the cooling unit.

36. Refrigerating apparatus comprising a refrigerant liquefying unit and an evaporating unit in refrigerant flow relationship, a source of electricity, means for energizing said liquefying unit from said source of electricity, a control device responsive to conditions created by said evaporator for starting and stopping said means, chronometrically operated means actuated by said source of electricity for measuring time cycles and for first modifying the action of and afterward restoring to its normal condition said control device at least once during each time cycle.

ROBERT R. CANDOR.